Patented Apr. 30, 1929.

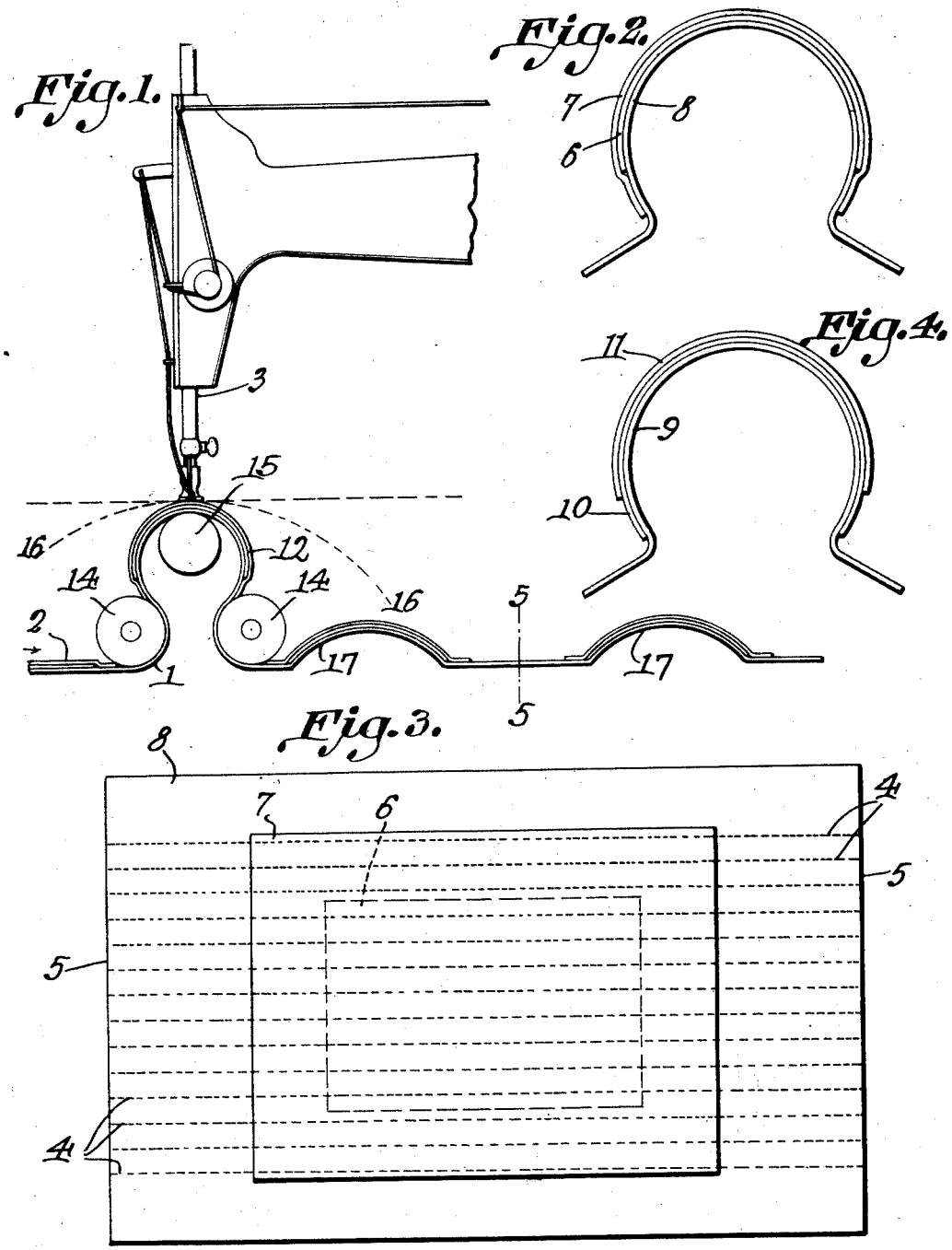

1,711,014

UNITED STATES PATENT OFFICE.

ALVA H. COOPER, OF ATLANTA, GEORGIA.

BLOW-OUT SHOE.

Application filed March 19, 1926. Serial No. 95,948.

This invention aims to provide a novel method of making blow-out patches or shoes in a strip. It contemplates, also, the fashioning of the blow-out patches on the curve which they will assume whilst they are in use in a tire casing, the result being that the patches will not buckle when placed in the tire casing, the strain on the stitching which unites the layers of the patch being relieved, moreover, since the layers of the patch or boot are stitched together in the form which the boot will assume in a tire casing.

It is within the province of the disclosure to improve generally and to enhance the utility of methods of the sort to which the present application appertains.

Although a preferred embodiment has been shown, it will be understood that a skilled person working within the scope of what is claimed, may depart somewhat from the specific disclosure, without departing from the spirit of the invention.

In the drawings:—

Figure 1 shows diagrammatically, those steps which consist in carrying the stacks of patches, on a strip, into the field of a stitching mechanism, and flexing the stacks and the strip, at the time they are stitched, to assume the shape which the shoe will take in a tire casing;

Figure 2 is a cross section of the finished boot or patch;

Figure 3 is a plan of the boot or patch developed;

Figure 4 is a cross section showing a slight modification.

In putting the invention into practice, stacks of suitable material, such as canvas, or canvas and rubber, are placed in spaced relation on a strip, of canvas or any other material, the stacks being made up of superposed layers, the stacks being marked by the numeral 2, and the strip being designated by the numeral 1. The strip 1 is advanced to carry the stacks 2 into the field of a stitching mechanism 3, the stacks being stitched to the strip as shown at 4, in any suitable way. The strip 1 is severed at 5, at points between the stacks 2, after the stacks have been stitched to the strip. The result is that a string of blow-out boots may be made rapidly in a single length and then cut up to form the commercial boot which is depicted in Figure 3 of the drawings. The constituent layers of the stacks may be arranged in any desired way. For instance, as shown in Figure 2, a small layer 6 may be located between a larger layer 7 and that part 8 of the boot which is a portion of the strip 1: or, as shown in Figure 4, the layers may decrease in area as they extend outwardly, the large member, which formed part of the strip 1, being designated by the numeral 9, the layer which is intermediate in size, and marked by the numeral 10, coming next, and the smallest layer 11 being on the outside.

Another specific improvement consists in flexing the stacks 2 of layers, and the strip 1, as shown at 12 in Figure 1, to assume, approximately, the curve which the shoe will take when in use in a tire casing, the stitching at 4 (or its equivalent) being done whilst the parts are flexed as at 12. As a result of this step, the boot will not buckle when it goes into the tire casing, nor will the stitching be strained or broken when the boot is in use.

The strip 1 and the stacks 2 may be run over guide members 14, such as rollers journaled for rotation, and over a support 15, wherewith the stitching mechanism cooperates immediately. By shifting the rollers 14, the boot, at the time that it is stitched, may be held in a variety of different curves, varying in radius from the curvature shown at 12 to that indicated by the dotted arc shown at 16—16. Whilst the strip 1 is being advanced, the patches probably will be drawn a little out of their normal curvature, as designated at 17 in Figure 1, but when released from tension, they will reassume the normal curvature shown at 12 in Figure 1, and in Figures 2 and 4.

What is claimed is:—

In a method of making blow-out shoes, steps which comprise placing superposed layers on an elongated strip in stacks which are spaced apart longitudinally of the strip, advancing the strip in the direction of its length to carry the stacks one at a time into the field of a stitching means, flexing the strip and the stacks transversely of the length of the strip and flexing the strip transversely of its length and independently of the stacks at points between the stacks whereby the stacks and the parts of the strip between the stacks will assume approximately the curve which the shoe will take when in use in a tire casing, stitching the stacks and the strip together whilst they are flexed to assume the aforesaid curve, and severing the strip at points between the stacks after the stacks and the strips have been stitched together.

In testimony that I claim the foregoing as my own, I have hereto affixed my signature.

ALVA H. COOPER.